United States Patent [19]

Rosinski et al.

[11] Patent Number: 5,381,467

[45] Date of Patent: Jan. 10, 1995

[54] TELEPHONE CALL BILLING SYSTEM

[75] Inventors: Richard R. Rosinski, Middletown; Steven C. Salimando, Little Silver, both of N.J.

[73] Assignee: AT&T Corp., Murray Hill, N.J.

[21] Appl. No.: 968,701

[22] Filed: Oct. 30, 1992

[51] Int. Cl.⁶ .............................................. H04M 15/00
[52] U.S. Cl. ..................... 379/121; 379/111; 379/113; 379/114; 379/120; 379/122
[58] Field of Search ............... 379/111, 112, 113, 114, 379/116, 119, 120, 121, 122

[56] References Cited

U.S. PATENT DOCUMENTS

| | | | |
|---|---|---|---|
| 4,788,719 | 11/1988 | Gupta | 379/114 |
| 4,791,640 | 12/1988 | Sand | 379/112 |
| 4,935,956 | 6/1990 | Hellwarth et al. | 379/112 |
| 5,003,584 | 3/1991 | Benyacar et al. | 379/119 |
| 5,023,868 | 6/1991 | Davidson et al. | 379/112 |
| 5,103,475 | 4/1992 | Shuen | 379/116 |
| 5,109,401 | 4/1992 | Hattori et al. | 379/112 |
| 5,146,491 | 9/1992 | Silver et al. | 379/114 |
| 5,148,474 | 9/1992 | Haralambopoulos et al. | 379/120 |
| 5,179,584 | 1/1993 | Tsumura | 379/121 |
| 5,218,632 | 6/1993 | Cool | 379/119 |
| 5,222,125 | 6/1993 | Creswell et al. | 379/114 |

OTHER PUBLICATIONS

Ser. No.: 07/629,912 U.S. patent application filed on Dec. 19, 1990 and allowed on Sep. 11, 1992 to N. V. Chau et al., Title: Method and Apparatus for the Billing of Value-Added Communication Calls.

Primary Examiner—Stephen Chin
Assistant Examiner—Vijay Shankar
Attorney, Agent, or Firm—Eugene J. Rosenthal; Barry H. Freedman

[57] ABSTRACT

The cost of a telephone toll call is shared by arranging the billing system of the telephone toll carrier to permit sharing of the period cost for at least one indivisible time period of a toll call. Accordingly, at least a portion of the period cost associated with at least one of the indivisible time periods of a toll call is assigned to both the terminating and originating subscribers, so that each subscriber to the toll call is billed for a portion of the total basic cost incurred for each of those indivisible periods of time over which it is agreed that the period costs will be shared. An authorization signal, indicating that the subscriber who would not have shared in the period costs for any indivisible period if the call had the call been placed as in the prior art—typically the terminating subscriber—agrees to accept his share of the period costs, may be required before any period cost sharing periods can occur.

34 Claims, 6 Drawing Sheets

| TERMINATING ANI 401 | ORIGINATING ANI 403 | PIN 407 | PORTION(%) 405 |
|---|---|---|---|
| (201) 123-4567 | (712) 456-7891 | | 60 |
| (201) 123-4567 | (906) 234-5678 | | 45 |
| (201) 123-4567 | (308) 765-4321 | | 75 |
| (201) 123-4567 | (308) 543-2198 | | 50 |
| (201) 123-4567 | | 6789 | 85 |
| (201) 123-4567 | | 1234 | 20 |
| (408) 456-7891 | (912) 234-5678 | | 50 |
| (500) 123-4567 | (212) ???-???? | | 20 |
| (500) 123-4567 | (718) ???-???? | | 20 |
| (500) 123-4567 | (201) ???-???? | | 50 |
| (500) 123-4567 | (908) ???-???? | | 50 |
| (500) 123-4567 | (609) ???-???? | | 50 |
| (500) 123-4567 | (404) ???-???? | | 90 |
| (500) 123-9876 | (???) ???-???? | | 35 |
| (908) 572-4321 | (908) 572-???? | | 50 |
| (908) 572-4321 | (908) 819-???? | | 50 |

| TERMINATING ANI<br>401 | ORIGINATING ANI<br>403 | PIN<br>407 | PORTION(%)<br>405 |
|---|---|---|---|
| (201) 123-4567 | (712) 456-7891 | | 60 |
| (201) 123-4567 | (906) 234-5678 | | 45 |
| (201) 123-4567 | (308) 765-4321 | | 75 |
| (201) 123-4567 | (308) 543-2198 | | 50 |
| (201) 123-4567 | | 6789 | 85 |
| (201) 123-4567 | | 1234 | 20 |
| (408) 456-7891 | (912) 234-5678 | | 50 |
| (500) 123-4567 | (212) ???-???? | | 20 |
| (500) 123-4567 | (718) ???-???? | | 20 |
| (500) 123-4567 | (201) ???-???? | | 50 |
| (500) 123-4567 | (908) ???-???? | | 50 |
| (500) 123-4567 | (609) ???-???? | | 50 |
| (500) 123-4567 | (404) ???-???? | | 90 |
| (500) 123-9876 | (???) ???-???? | | 35 |
| (908) 572-4321 | (908) 572-???? | | 50 |
| (908) 572-4321 | (908) 819-???? | | 50 |

*FIG. 4*

TERMINATING NUMBER 341

| |
|---|
| (201) 123-4567 |
| (201) 234-5678 |
| ⋮ |
| (201) XXX-XXXX |
| (408) 345-6789 |
| (408) 456-7891 |
| ⋮ |
| (408) XXX-XXXX |
| (500) 123-4567 |
| ⋮ |
| (500) XXX-XXXX |
| (908) 123-4567 |
| (908) 567-8912 |
| ⋮ |
| (908) XXX-XXXX |

TELEPHONE CALL BILLING SYSTEM

TECHNICAL FIELD

This invention relates generally to the processing of telephone calls, and more particularly, to billing for the costs of such calls.

BACKGROUND OF THE INVENTION

The basic cost for a telephone toll call placed between telephone subscribers is typically billed to the subscriber originating the call (originating subscriber). Such a basic cost is the cost that the originator at a wired telephone station would be required to pay for the call if the call were to be completed directly to another wired telephone station terminating the number dialed. The basic cost for each such call is usually a function of the length of time that passes while the originating subscriber is connected to the terminating subscriber. To develop the basic cost, time is divided into predetermined indivisible time periods, typically of identical length and conventionally one minute in length, to which a period cost is assigned and the accumulation of the period costs for each of the indivisible time periods in the call is the basic cost. The period cost is typically expressed as a dollar value. In some systems, however, period costs may be expressed in terms of messages units, where each message unit has an identical fixed unit cost.

It is possible to make a so-called "collect call", i.e., a call for which the billing of the basic cost of the call is reversed, so that the terminating subscriber pays the basic cost of the call. It is also possible for the basic cost to be reversed only for a portion of the time of the call, so that the entire period cost for some of the indivisible time periods are charged to the originating subscriber while the entire period cost for the remaining ones of the indivisible time periods of the call are charged to the terminating subscriber.

In addition to its basic cost, each call may have a set of additional costs. The additional costs in such a set are each allocated, individually, to one of the subscribers on the call. These additional costs represent the costs associated with the particular ones of advanced services beyond the bare minimum basic telephone service provided for the call. For example, a call from New York, N.Y., dialed to a first, fixed, location in East Brunswick (EB), N.J. that is forwarded to a second, fixed, location in Holmdel, N.J. (HO) engenders a cost for forwarding the call from the first location (EB) to the second location (HO) in addition to the basic cost of the call as originally placed from New York, N.Y. to the first location (EB). The basic cost for the call, which is the cost of reaching the first location, is charged to the originating subscriber while any additional cost for the forwarding is borne by the terminating subscriber who activated the forwarding feature. The cost for the forwarding may also be a function of the length of time that passes while the originating subscriber is connected to the terminating subscriber. Similarly, for a non-collect call from a wired telephone to a cellular telephone, the basic cost for the call is borne by the originating subscriber while the additional cost of so-called "air time charges" is borne by the terminating cellular subscriber.

SUMMARY OF THE INVENTION

We have realized that the prior art approach to the billing of telephone toll calls, in which only a single subscriber is obligated to pay for the entire period cost of each indivisible time period of a toll call, is unduly limiting, and, in accordance with the principles of the invention, this limitation is overcome by arranging the billing system of the telephone toll carder to permit sharing of the period cost for at least one indivisible time period of a toll call. Accordingly, at least a portion of the period cost associated with at least one of the indivisible time periods of a toll call is assigned to both the terminating and originating subscribers, so that each subscriber to the toll call is billed for a portion of the total basic cost incurred for each of those indivisible periods of time over which it is agreed that the period costs will be shared. An authorization signal, indicating that the subscriber who would not have shared in the period costs for any indivisible period if the call had been placed as in the prior art—typically the terminating subscriber—agrees to accept his share of the period costs, may be required before any period cost sharing periods can occur.

In one embodiment, the apportionment of the basic cost of a call is automatically authorized according to a predetermined agreement as to the sharing of each of the call's period costs, and the authorization signal is automatically generated, if the originating subscriber meets predetermined criteria with respect to each call. Such criteria, which may be prestored in a data base, include a) the location from which the originating subscriber originates the call, e.g., the automatic telephone number identification (ANI), i.e., the telephone number of the station set from which the originating subscriber is placing the call, b) the ability to supply particular knowledge, such as knowledge of a predetermined personal identification number (PIN) or c) the possession of particular identifying physical characteristics, e.g., retina pattern. For example, the authorization signal is generated when the telephone number of the originating subscriber matches a telephone number listed in a list containing the telephone numbers from which the terminating subscriber is willing to share the basic cost on a period cost basis. In this embodiment, the period cost for every indivisible time period in the call is shared, with the portion of the period cost to be accepted being a predetermined percentage, also stored in the data base, that is associated with the telephone number of the originating subscriber. As a result the basic cost for the entire call is shared according to the same percentages. Advantageously, in such an embodiment, the development of the authorization signal and operation of the invention are transparent the terminating subscriber.

In another embodiment, the authorization signal is developed in response to actions taken by the terminating subscriber after call setup by, for example, keying predefined codes via the telephone keypad.

In yet another embodiment, the period cost for each indivisible period being shared is altered, so that each subscriber to the call is charged for his respective portion of the period cost at the rate which would have been in effect had he originated the call and been solely responsible for the basic cost of the entire call. Thus, each of the subscribers receives the benefit of any time zone differential in the billing rate to which they would have been entitled had they originated the call. Furthermore, the subscribers are charged for the call at the rate applicable after any special originating plan discounts to which they may have been entitled, had they originated the call. As a result, the sum of the resulting basic costs borne by each subscriber for the call may be less than the basic cost of the call had it been charged only to the originating subscriber.

DETAILED DESCRIPTION

To understand the present invention, the typical arrangements in telephone networks for recording messages used to bill charges for telephone calls should be first described. Such arrangements operate by recording the relevant billing data for each toll call, or connection, in a so-called automatic message account, or AMA, message record. Typical message record fields are the originating and terminating telephone numbers and elapsed time of call. In a typical system, the message records, which are opened for each call upon receipt of answer supervision for the call and are closed at a time substantially contemporaneous with the termination of the call, are transmitted from an originating switch to a message accumulation system. The latter distributes the accumulated messages to appropriate further processing systems which translate the AMA message records into the industry-standard "exchange message interface," or EMI, message record format. The EMI records are thereupon forwarded to a rating system which, inter alia, computes the toll charges applicable to the calls and adds an indication of those charges to the EMI record. The records so formed are forwarded to a billing system in which they reside until processed to generate, typically, "hard copy" bills which are mailed to subscribers. Thus, conceptually, each subscriber is associated with an account to which the cost of calls are charged until they are billed and payment becomes due.

It is noted that, as used herein, the word subscriber it is not intended to limit the authority for activating the call cost sharing feature to the particular person in whose name the telephone facilities used for originating or terminating calls is listed or the person legally held responsible for paying for the cost of calls. Such a listed, or responsible, person would be considered the "owner" of the above-mentioned account associated with such facilities to which the cost of calls are charged. Instead, subscriber is meant to also include anyone authorized by such an owner to charge to his account the cost of telephone calls, by making telephone calls or accepting charges for received telephone calls using his facilities. Thus, for example, all family members of a head of a household may make and receive calls over his telephone line, so that those members of his household are also subscribers. It is also noted that the telephone equipment of an owner, such as a telephone set and line, may temporarily become the telephone facilities of another person, through the use of personal communication services or other third party billing mechanisms.

One embodiment of the invention more particularly relates to the generation of message records for long-distance—or so-called interexchange—calls, which involve the use of the facilities of a long-distance, or interexchange, carrier, also referred to as an IXC. In the United States, for example, AT&T, MCI and Sprint are three such IXCs. Each subscriber to local telephone service from a local exchange carder, or LEC, such as New Jersey Bell, has an associated "primary interexchange carrier," or PIC, that was selected by or for the local subscriber. The local subscriber is said to be "PIC'd" to the associated IXC. When a long-distance call is initiated by the subscriber, the call is routed through the network of the originating subscriber's LEC, over the network of the PIC and, ultimately, through the network of the LEC which has as one of its subscribers the terminating subscriber. At the termination of the call, a switch which carried the call—illustratively, a switch in the interexchange carrier's network—generates the AMA record as described above.

Figure 1:
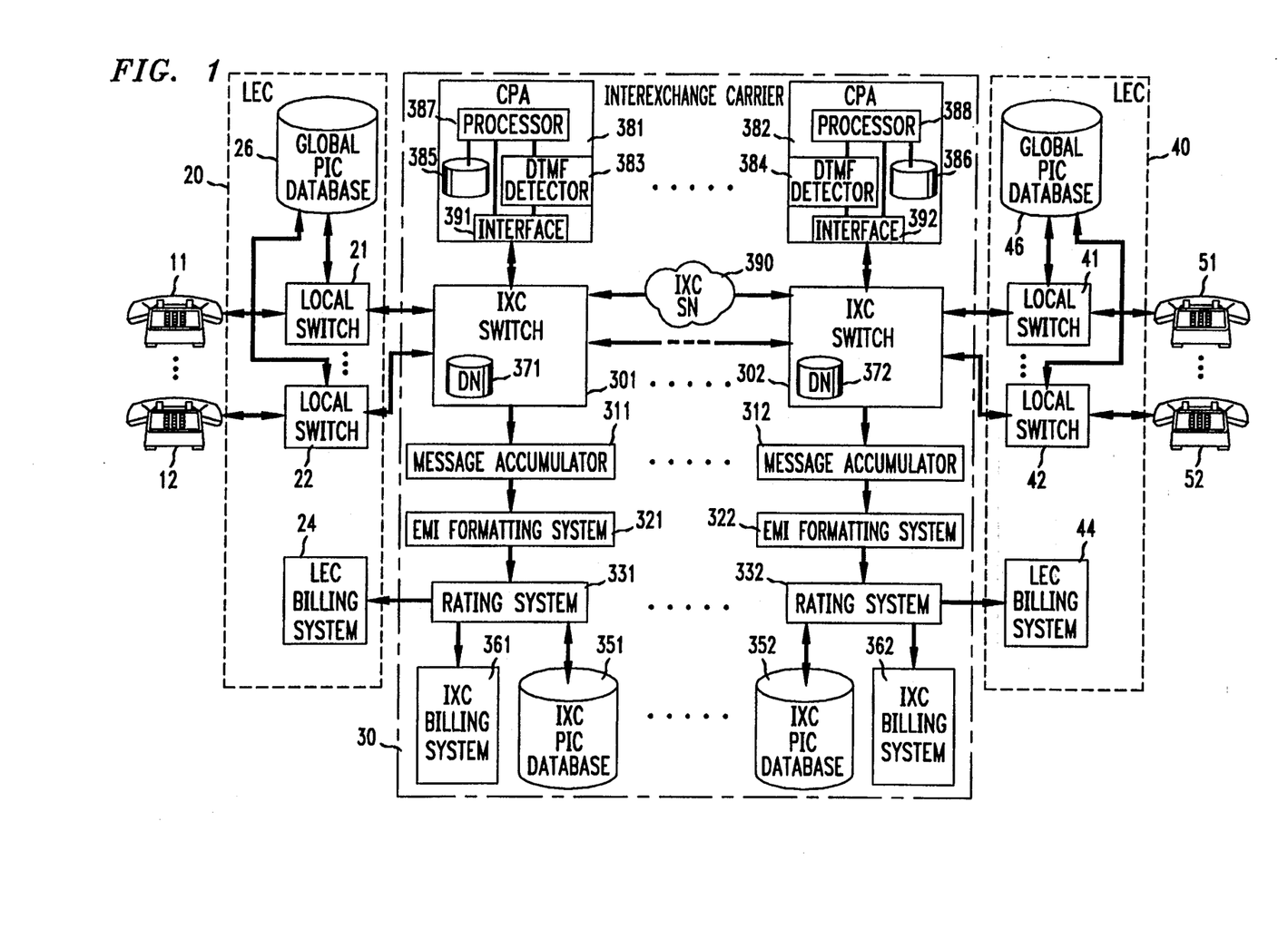
FIG. 1 shows an exemplary architecture of a network for processing calls, in accordance with the principles of the invention.

In FIG. 1, a plurality of telephone subscribers 11 . . . 12 are provided with local exchange service by local exchange carrier (LEC) 20. LEC 20 includes a plurality of local central office switches 21 . . . 22 which serve respective ones of the subscribers. When a long-distance call is originated by one of the subscribers, say subscriber 11, the associated local switch 21 recognizes from the dialed telephone number—specifically the area code thereof—that this is, indeed, a long-distance call. As a part of the processing of this call, switch 21 accesses data base 26 in which is stored an identification of the primary interexchange carrier, or PIC, for each of the LEC's subscribers. Inasmuch as data base 26 has PIC information relating to all the interexchange carriers, or IXCs, to which it has access, the data base is referred to herein as the "global" PIC data base.

In this example, subscriber 11 is PIC'd to IXC 30. That is, IXC 30 is that subscriber's selected primary interexchange carrier. IXC 30 includes a network of interexchange carrier switches which are illustratively AT&T 4ESS ™ switches. The call is routed by local switch 21 to IXC 30 and, more particularly, to originating switch 301 therein. Within the network, the call is ultimately routed to IXC terminating switch 302. In being carried over the network, the call may have also been directed, for example, across various trunks and through various switching nodes (not shown), as is well known in the art.

Also shown in FIG. 1 is LEC 40 which has as one of its subscribers the subscriber to which the call in question is being directed. Similar to LEC 20, LEC 40 includes local switches 41 . . . 42 which serve respective LEC subscribers 51 . . . 52, as well as a global PIC data base 46, which is used when outgoing long distance calls are made by subscribers 51 . . . 52. In this example, the terminating subscriber is subscriber 51. It may be noted at this point that it is possible for a call to be routed by LEC 20 to IXC 30 even if the originating subscriber is not PIC'd to IXC 30. For example, a subscriber PIC'd to another IXC can instruct LEC 20 to route the call via IXC 30 by prefixing the terminating telephone number by an access code that identifies IXC 30.

IXC switches 301 and 302 are interfaced to respective ones of common platform adjuncts (CPAs) 381 ... 382. CPAs are processors designed to supplement the functionality available with already existing IXC switches so that together they can provide features that such switches could not otherwise provide without significant redesign. One such feature, the call cost sharing feature, permits, in accordance with the principles of the invention, the period cost of the call, represented by the period costs for at least one indivisible time period of a toll call, to be shared by the originating and terminating subscribers, so that a portion of the total basic cost of the call, represented by the period costs for the indivisible time period over which it is agreed that period costs will be shared, is assigned to each. It is noted that new switches could be designed to have the functionality of a common platform adjunct built in.

CPA 382, an exemplary CPA, contains processor 388, which controls the operation of the CPA, connected to dual tone multi-frequency (DTMF) detector 384, data base 386 and interface 392. Interface 392 includes terminations for both voice channels and a signaling channel that pass between CPA 382 and IXC switch 372. In one embodiment, the connection between CPA 382 and IXC switch 372 is an Integrated Services Digital Network (ISDN) Primary Rate Interface (PRI) which provides 23 voice (B) channels and one data (D) channel associated with the voice channels. Optionally, interface 392 can supply alerts, e.g., tones or voice messages, over the voice channels. Interface 392 is connected to dual tone multi-frequency (DTMF) detector 384. Dual tone multi-frequency (DTMF) detector 384 can detect and transmit to processor 388 a decoded value for dual tone multi-frequency signals received on the channel terminated at interface 392. Interface 392 communicates messages between IXC switch 382 and CPA 382 to and from processor 388.

Figure 4:
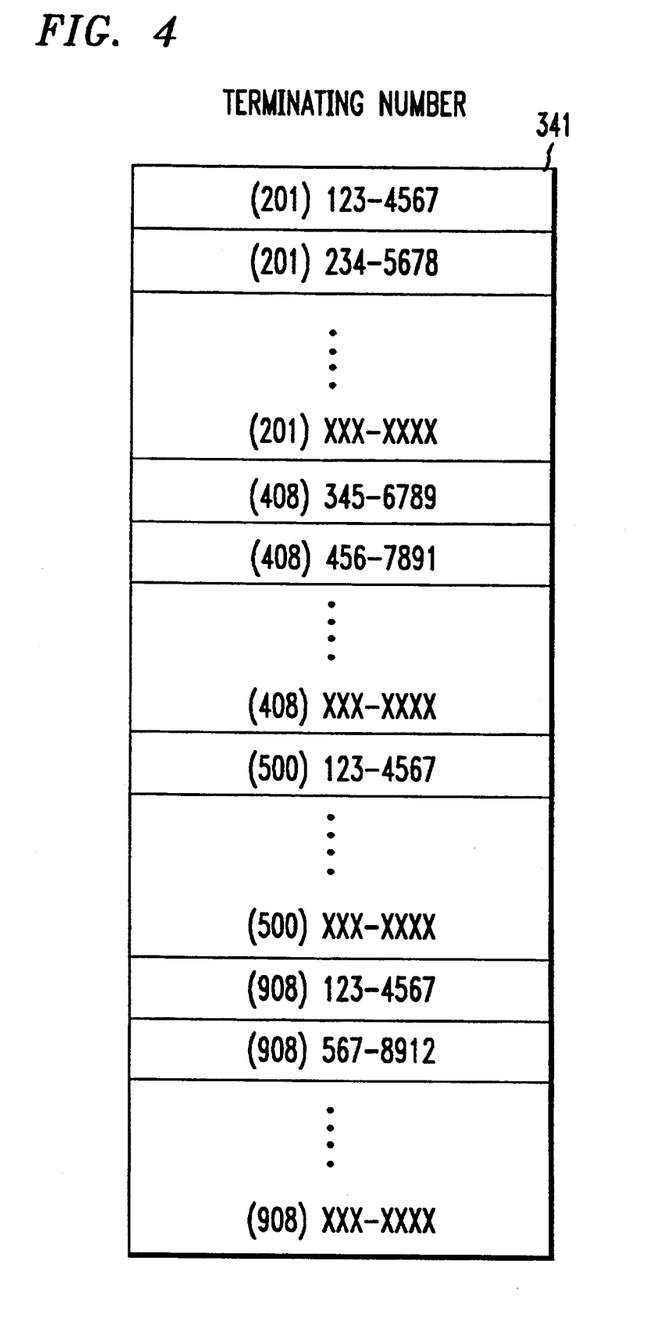
FIG. 4 shows an exemplary destination number (DN) trigger table of a switch in the network of FIG. 1 in which the telephone numbers of feature subscribers are listed in numerical order by area code and number.

Each IXC switch has, for use when it is a terminating switch, a respective one of destination number (DN) trigger tables 371 ... 372 in which are listed the numbers of subscribers to features that require a common platform adjunct (CPA) to provide at least some functionality for their implementation. FIG. 4 shows an exemplary DN trigger table in which the telephone numbers 341, colloquially also known as the automatic number identification (ANI), of feature subscribers are listed in numerical order by area code and number. XXX-XXXX is a representation indicating the last number stored for any particular area code.

For the call placed from subscriber 11 to subscriber 51, IXC terminating switch 302 tests to determine if the telephone number of subscriber 51 is listed in its DN trigger table. If the terminating subscriber number is not listed, IXC terminating switch 302 routes the call to local switch 41 which, in turn, passes the call to its terminating subscriber 51. A connection between subscribers 11 and 51 is thus made, the connection including both LECs and the IXC, as is typical in the prior art.

However, if the terminating subscriber number is listed in DN trigger table 372 of IXC terminating switch 302, then IXC terminating switch 302 queries CPA 382 by sending it 1) the so-called calling party number (CPN), i.e., the telephone number (ANI) of the terminating subscriber, and 2) an indication that IXC originating switch 301 is to generate the aforementioned AMA record. CPA 382 looks up the features that it is to provide for the terminating party number and, if call cost sharing is to be provided, it informs IXC terminating switch 302 that it is going into a so-called "monitor mode". In monitor mode, CPA 382 is bridged onto the call so that it may receive, decode and respond to dual tone multi-frequency (DTMF) signals from terminating subscriber 51. The bridge may be achieved either by instructing IXC terminating switch 302 to route the call through CPA 382 or to bridge CPA 382 as a station in a conference call. Optionally, when the call is answered by terminating subscriber 51, CPA 382 may be so informed and, in response thereto, CPA 382 may play a brief tone informing the terminating subscriber that the call cost sharing feature is available on the call.

In accordance with an aspect of the invention, should terminating subscriber 51 decide to accept a portion of the period costs for all the indivisible time periods of the just established telephone call, he dials, on the keypad of his telephone station set, the digits corresponding to a predetermined code for activating the call cost sharing feature. Such an arrangement results in a sharing of the basic cost of the call, with the cost assigned to each subscriber being a function of the number of indivisible time periods in the call and the period cost of each such period. The dual tone multi-frequency (DTMF) tones generated in response to the dialed digits pass through local switch 41 and IXC terminating switch 302 to CPA 382, where DTMF detector 384 detects and decodes the received signals into their corresponding digits. CPA 382 determines if the decoded digits correspond to at least one of the codes for activating the call cost sharing feature.

If the code received indicates that the call cost sharing is to be activated, CPA 382 must determine the portion of the period cost of each of the indivisible time periods of the call to be assigned to subscribers 11 and 51, respectively. The portion assignments may be a) specified by subscriber 51 as part of the digits dialed in the code activating the call cost sharing feature, b) agreed to in advance of the call or c) may be assigned by default. If the code received includes an indication of the portion of the period cost of each of the indivisible time periods of the call that the terminating subscriber is willing to accept, the request to activate the call cost sharing feature includes an indication to assign such a portion to the terminating subscriber. For example, if the format of the activation code is a fixed code, e.g., * 2 1, followed optionally by 1) a delimiter, e.g., #, and 2) two digits representing the portion, as a percentage, of the cost to be accepted by terminating subscriber 51, then the code * 2 1 # 7 5, could indicate activation of the call cost sharing feature with a willingness by terminating subscriber 51 to accept 75% of the period cost of each indivisible period, resulting in an acceptance of 75% of the cost of the call. The portion indication percentage could be limited to a predetermined range of values and to particular values within that range, e.g., between 5%, represented as 0 5, and 95%, represented as 9 5, with a step value of 5%.

Figure 3:
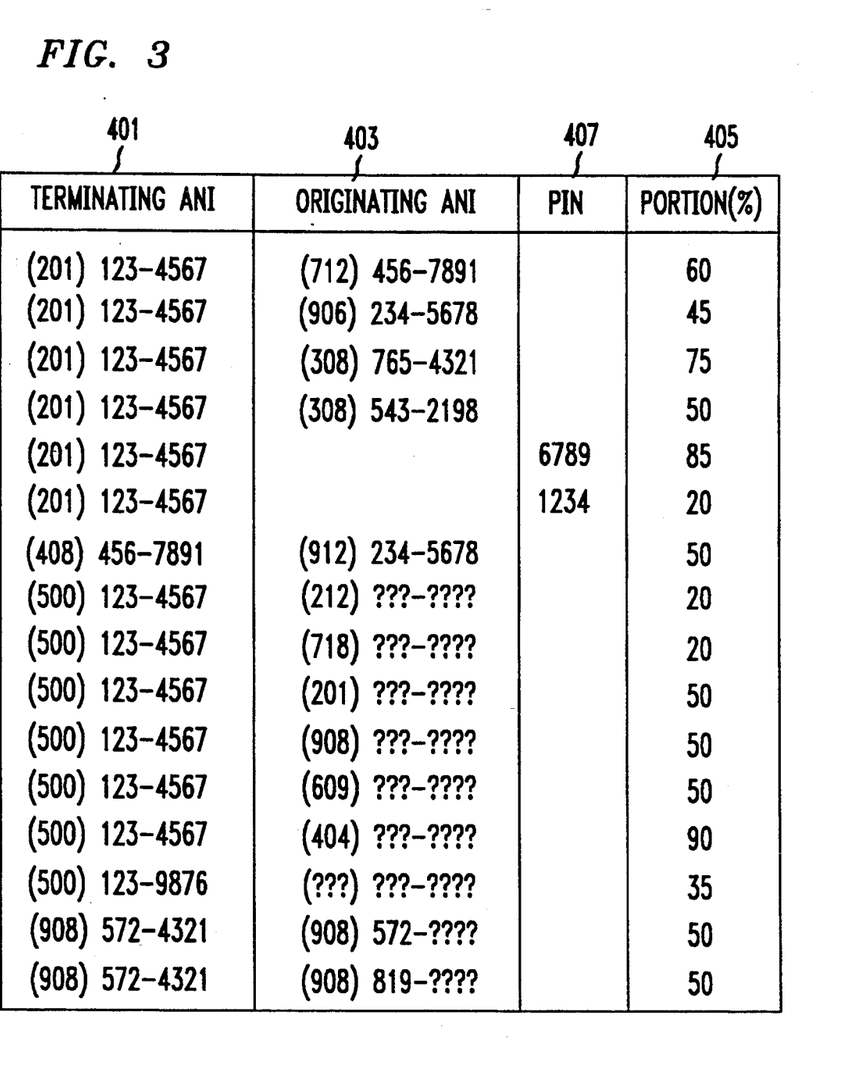
FIG. 3 shows an exemplary structure for a data base used by common platform adjuncts (CPAs) shown in the network of FIG. 1.

If the delimiter and following digits are not supplied within a predetermined period of time, e.g., because terminating subscriber 51 dialed only the code * 2 1, it is initially presumed that there is a prearranged agreement between the originating subscriber and the terminating subscriber as to how to share the period costs for calls between them. Accordingly, CPA 382 accesses data base 386 to determine if there is a preprovisioned, existing association between the ANIs of subscribers 11 and 51. FIG. 3 shows an exemplary structure for data base 386. An association exists if there is an entry of the ANI of the terminating subscriber in terminating ANI field 401 and an entry on the same line of the originating subscriber's ANI in originating ANI field 403.

If there is such an association, then there is an associated prestored indication of the portion of the period cost of each indivisible time period that the terminating subscriber in such a call is willing to assume. In one embodiment, such an indication is a two digit code representing a percentage. The prestored indication is retrieved and used in place of the digits that were not supplied. In the structure of FIG. 3, the portion indication is stored on the same line as the terminating and originating ANIs in portion (%) field 405. If the call cost sharing feature is activated without the terminating subscriber supplying digits indicating that portion of the period cost of each indivisible time period that he was willing to assume, and yet there is no prestored association between the ANIs of the subscribers 11 and 51, a default value, e.g., 5 0, indicating that a predefined portion of the period cost, e.g., 50%, is assumed by terminating subscriber 51. The default value is used in place of the digits that were not supplied.

CPA 382 sends a message, i.e., an authorization signal, to IXC terminating switch 302 that instructs it to send to IXC originating switch 301 a message indicating that call cost sharing feature was activated and the portion of the period cost for each indivisible time period, however determined, that should be assigned to terminating subscriber 51. IXC terminating switch 302 forwards the message to IXC originating switch 301 over IXC signaling network (SN) 390. The construction of messages for such communication is well known. Signaling networks are also well known in the art. CPA 382 may then cause itself to be dropped from the call. Furthermore, at any time after activation of the call cost sharing feature and before dropping from the call, CPA 382 may provide either or both of subscribers 11 and 51 with an alert indicating that the call cost feature was activated.

In response to receiving the message from IXC terminating switch 302, IXC originating switch 301 marks the AMA record being developed for the call with an indication of the portion of the period cost for each indivisible time period agreed to be accepted by subscriber 51, in accordance with the principles of the invention. At the completion of the call, IXC originating switch 301 recognizes that the AMA record for the call (connection) has been so marked and creates a duplicate of the AMA record, in accordance with the principles of the invention. Furthermore, the reverse billing flag of the duplicate AMA record is set, in accordance with the principles of the invention, so that the cost reflected therein will be billed to terminating subscriber 51. The original AMA record is then remarked, in accordance with the principles of the invention, to reflect that the originating subscriber must pay the basic costs for the call that were not assumed by the terminating subscriber. Thus, if the portions of the period costs accepted for each indivisible time period of the call are expressed in terms of percentages, the original AMA record is marked with the percentage of the period cost that the terminating subscriber is willing to assume and the duplicate AMA record is marked with one hundred percent minus that percentage.

IXC originating switch 301 is periodically polled, along with other like switches, by an associated one of message accumulator systems 311 . . . 312. In this example it is message accumulator system 311. Indeed, the principal function of each one of systems 311 . . . 312 is the accumulation of AMA records from the various switches that it serves. The message records of various terminating subscribers are processed by various ones of the rating systems 331 . . . 332, depending on the location of those subscribers. For example, message records for calls originated by subscriber 11 are processed by rating system 331.

On a periodic basis, on the order of several times a day, each message accumulator sends its accumulated AMA records to a corresponding one of EMI formatting systems 321 . . . 322. In this case, it is system 321. The latter translates the AMA records into the aforementioned industry-standard EMI message record format. The EMI records are thereupon periodically forwarded-again, on the order of several times a day-to a respective one of rating systems 331 . . . 332. In this case it is system 331. Among the functions of rating systems 331 . . . 332 is to "rate" each call, by which is meant the computation of the standard toll charges or rated charge, applicable to each EMI record and to add an indication of same to the EMI record.

Figure 2:
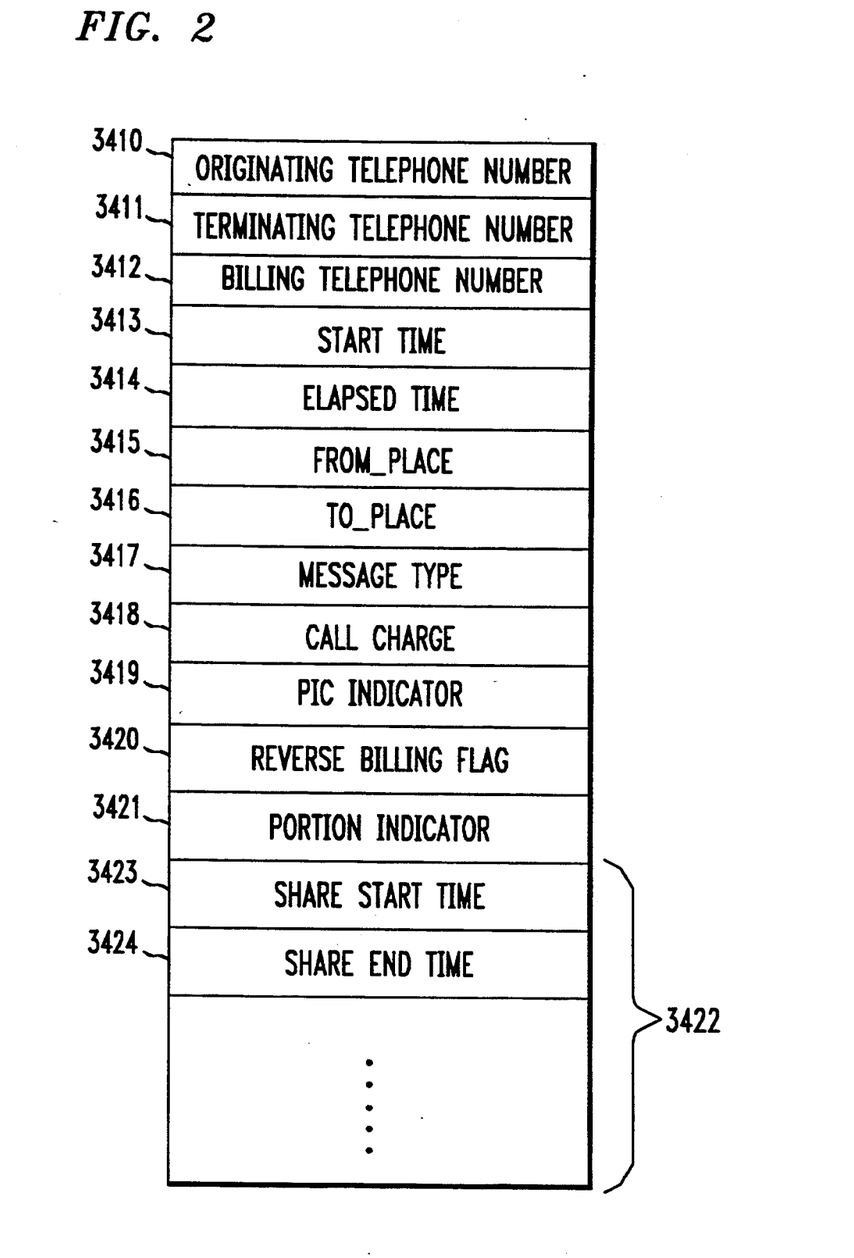
FIG. 2 is a conceptual representation of an exchange message interface (EMI) record including new fields necessary to support the call cost sharing feature of the invention.

FIG. 2 is a conceptual representation of an EMI record, some of the fields of which are filled by the EMI formatting systems and others of which are filled in by the rating systems. (Other fields may be completed by yet other systems which process the EMI record.) The fields are shown, for pedagogic convenience, in an order that is different from that actually specified by the EMI standard, as will be appreciated by those skilled in the art. In addition, new fields necessary to support the call cost sharing feature are shown.

As shown in FIG. 2, some of the more significant fields of the EMI record are the originating telephone number 3410 (i.e., the telephone number (ANI) of the originating subscriber); the terminating telephone number 3411 (i.e., the telephone number (ANI) of the terminating subscriber); the billing telephone number 3412, which is typically empty but may be some number as, for example, when a telephone calling card is used to pay for the call; the start time for the call 3413; the elapsed time 3414, i.e., the duration of the call; the geographic call origination and termination points, e.g. Highland Park, N.J. and San Francisco, Calif., denoted as FROM_PLACE 3415 and TO_PLACE 3416; message type 3417, which indicates that the call was, for example, a direct-dialed domestic call, an operator-assisted international call, etc.; call charge 3418, which is the basic call cost for the call computed as a function of various ones of the message characteristics recorded in the EMI message such as described above; PIC indicator 3419; reverse billing (collect call) flag 3420; in accordance with the invention, portion indicator 3421; and various other data fields denoted as 3422.

The rating system receives the EMI records from EMI formatting system 321. The system then proceeds to "rate" each call, i.e., compute the value of the basic cost of each call to be placed in call cost 3418 of each record. As is well known, the basic cost for each toll call, as rated by a rating system, is usually determined as a function of the length of time that passes while the originating subscriber is connected to the terminating subscriber. The total length of time that passes while the originating subscriber is connected to the terminating subscriber is divided into indivisible time periods, usually having identical predetermined lengths, and a period cost is assigned to each period. A typically used value for the length of each indivisible time period is one minute. The number of time periods is rounded off so that each call has an integral number of indivisible time periods. The totalized cost of the period costs for all of the time periods of the call is the basic cost of the call.

In one embodiment of the invention, the rating proceeds in two phases. The first phase is the prior art rating which determines the basic cost of the call as if the call cost sharing feature did not exist. The second phase is performed only if the rating system determines that a value has been stored in portion indicator 3421. In the second phase, in accordance with the principles of the invention, the basic cost of the call as determined in the first phase is multiplied by the value, expressed as a percent, that is indicated in portion indicator 3421. The resulting cost, which thus reflects a sharing of the period cost for each of the indivisible time periods in the call, is then placed in call charge 3418 field of the EMI record. Advantageously, the sum of the costs in the EMI records for both portions of a single call is the same as the cost of the call would have been had the call cost sharing feature not been employed. This permits the total revenue to IXC 30 to remain constant. Additional known functionalities not relevant here may also be carried out by the rating system. After perhaps performing any such other functions, rating system 331 transfers, or transmits, the now rated EMI message to a billing system for subsequent processing.

There are at least two possible types of billing systems to which the EMI messages may be transferred by rating system 331, a LEC billing system or an IXC billing system. Each LEC includes a LEC billing system, such as LEC billing systems 24 and 44 within LECs 20 and 40, respectively. To the extent that call charges from IXC 30 are included within the bills rendered by a subscriber's LEC, the EMI records for calls to be billed to that subscriber are transferred to a LEC billing system. The LEC billing system to which the EMI records are transferred depend on the values in the original telephone number 3410, terminating telephone number 3411, billing telephone number 3412 fields and the value of reverse billing flag 3420.

Alternatively, IXC 30 may render separate bills to at least ones of its subscribers. The EMI records for calls to be billed to such subscribers, instead of being transferred to a LEC billing system, are transferred to one of IXC billing systems 361 . . . 362 maintained and operated by the carrier itself. IXC billing system 361, for example, serves rating system 331 in this regard. IXC billing system 361 may thereupon print and mail a separate bill for IXC 30 charges. Alternatively, instead of printing and mailing its own bills for calls whose EMI records were transferred to IXC billing system 361, IXC 30 may use its billing system to totalize the bills- —and in the process, apply any applicable discounts- —and then provide an invoice in electronic form to the LEC billing system for ultimate printing of the bill and inclusion thereof in the overall billing package mailed to the subscriber.

The forgoing merely illustrates the principles of the invention. Thus, for example, although the invention is illustrated in the context of a particular type of billing environment made up of various discrete systems, those skilled in the art will be able to implement the invention in any of a variety of telephone billing environments. Moreover, the invention is applicable to calls made within a so-called local access and transport area (lata-)—a so-called intra-lata call. Thus in the illustrative embodiment of FIG. 1, the local switches would be equipped with DN trigger tables and coupled to CPAs or they would be new switches with the capabilities of CPAs incorporated directly therein. It will thus be appreciated that those skilled in the an will be able to devise numerous arrangements which, although not explicitly shown or described herein, embody the principles of the invention and are within its spirit and scope.

In other embodiments of the invention, the apportionment of the period cost for each indivisible time period in the call is automatically authorized according to a predetermined agreement as to the apportionment of the period cost, and the authorization signal is automatically generated, if the originating subscriber meets predetermined criteria with respect to each call. Such criteria include a) the location from which the originating subscriber originates the call, e.g., the automatic telephone number identification (ANI), i.e., the telephone number of the station set from which the originating subscriber is placing the call, b) the possession of particular knowledge, such as knowledge of a predetermined personal identification number (PIN) or c) the possession of particular identifying physical characteristics, e.g., retina pattern.

For example, in an embodiment of the invention where call cost sharing for a particular terminating subscriber is based on the originating subscriber's telephone number, if the terminating subscriber's number is listed in DN trigger table 372 of IXC terminating switch 302 then IXC terminating switch 302 queries CPA 382 by sending it 1) the so-called terminating party number (CPN), i.e., the telephone number (ANI) of the terminating subscriber, 2) an indication that IXC originating switch 301 is to generate the aforementioned AMA record and 3) the ANI of originating subscriber 11. CPA 382 looks up the features that it is to provide for the destination number and, if call cost sharing is to be supported, it immediately accesses data base 386 to determine if there is a preprovisioned, existing association between the ANIs of subscribers 11 and 51. If there is such an association, then there is an associated prestored indication of the portion of the period cost of each indivisible time period in the call that the terminating subscriber of such a call is willing to assume. The call cost sharing feature is, therefore, immediately activated, as described above, using the associated prestored indication of the portion of the period cost that the terminating subscriber of such a call is willing to assume. Thus, advantageously, the call cost sharing feature is transparent to both the originating and terminating subscribers. Of course, an indication may optionally be given to either or both the originating and terminating subscribers indicating that the feature has been activated.

In a further refinement of this embodiment, the ANI of the called subscriber may be listed using so-called "wild cards", so that more than one telephone number would match to the ANI and activate the call cost sharing feature. For example, suppose a municipality having a main telephone number of (908) 572-4321 wished to share the cost of calls from its residents, who have telephone numbers in the form of (908) 819-???? and (908) 572-????, where ? is a wild card representing any digit. By entering (908) 819-???? and (908) 572-???? as ANIs in data base 386 for the municipalities telephone numbers, any originating subscriber having a telephone number of the listed type will invoke the call cost sharing feature. FIG. 3 shows such an arrangement for the terminating line having an ANI of (908) 572-4321.

Similarly, a business may wish to accept only a portion of the basic cost of the calls it receives from its customers rather than paying for the entire call, as is done with toll-free, "800" type numbers. The business can enter (???) ???-???? in data base 386 as the ANI for which it will agree to have the call cost sharing feature invoked thereby indicating it will accept a portion of the basic cost for any call made within the North American Numbering Plan. FIG. 3 shows such an arrangement for the terminating line having an ANI of (500) 123-9876.

Alternatively, the business could specify a list of area codes, each in the form of (NNN) ???-????, where NNN is a particular area code and ? is a wild card, from which they will accept a first portion of the basic cost of calls, a second list of area codes from which they will accept a second, greater portion of the basic cost of calls, a third list of area codes from which they will accept a third, even greater portion of the basic cost of calls, etc. by invoking the call cost sharing feature with differing portions of the period cost for each indivisible time period of the call to be accepted. Such an arrangement is shown in FIG. 3 for the terminating line having an ANI of (500) 123-4567. Twenty percent of the basic cost of calls from New York City (area codes 212 and 718), 50% of the basic cost of calls from New Jersey (area codes 201, 908 and 609) and 90% of the basic cost of calls from Atlanta, Ga. (area code 404) are accepted by the terminating subscriber. Callers from all other areas pay the full cost of their calls.

In an embodiment of the invention where the authorization signal is based on the supplying of particular knowledge, such as knowledge of a predetermined personal identification number (PIN), if the terminating subscriber's telephone number is listed in DN trigger table 372 of IXC terminating switch 302, then IXC terminating switch 302 queries CPA 382 by sending it 1) the so-called terminating party number (CPN), i.e., the telephone number (ANI) of the terminating subscriber, and 2) an indication that IXC originating switch 301 is to generate the aforementioned AMA record. CPA 382 looks up the features that it is to provide for the destination number and, if call cost sharing is to be supported, it informs IXC terminating switch 302 that it is going into so-called "monitor mode". In monitor mode, CPA 382 bridges onto the call so that it may receive, decode and respond to dual tone multi-frequency signals from originating subscriber 11. Again, the bridge may be achieved either by instructing IXC terminating switch 302 to route the call through or to bridge CPA 382 as a station in a conference call.

CPA 382 prompts originating subscriber 11 to supply particular knowledge, e.g., to enter a personal identification number (PIN) such as a four digit code. In accordance with an aspect of the invention, should originating subscriber 11 decide that for this call he wants terminating subscriber 51 to accept a portion of the basic cost for the just established telephone call, in accordance with their prior agreement, he responds to the prompt by dialing, on the keypad of his telephone station set, the digits corresponding to his PIN. The DTMF tones generated in response to the dialed digits pass CPA 382 where DTMF detector 384 detects and decodes the received signals into their corresponding digits. Accordingly, CPA 382 accesses data base 386 to determine if there is a preprovisioned, existing association between the ANI of subscriber 51 and the just received PIN. If there is such an association, then there is an associated prestored indication of the portion of each period cost for each indivisible time period of the call that the terminating subscriber is willing to assume. The call cost sharing feature is, therefore, immediately activated, as described above, using the associated prestored indication of the portion of the period cost that the terminating subscriber in such a call is willing to assume. FIG. 3 shows, in PIN field 407, two PINs associated with the line having a terminating ANI of (201) 123-4567. Of course, an alert may optionally be given to either or both the originating and terminating subscribers indicating that the call cost sharing feature has been activated.

For embodiments of the invention where the giving of the authorization signal is based on the originating subscriber supplying particular identifying physical characteristics, e.g., retina pattern, voice print or finger print, with respect to the terminating subscriber's telephone number (ANI), DTMF detector 384 would be replaced by, or supplemented with, a unit able to detect, decode and compare information representing a measurement of at least one such identifying physical characteristic taken from the originating subscriber with previously stored information for that subscriber. Such previously stored information could be stored in another field in the exemplary structure for data base 386 shown in FIG. 3. Operation would be as described above for PINs, with the measurement information being substituted for the PINs.

In another embodiment of the invention, each rating system receives EMI records and proceeds to "rate" the call, i.e., compute call cost 3418. If there is no value stored in portion indicator 3421, the call is billed as in the prior art. If the rating system determines that a value has been stored in portion indicator 3421, the call cost is computed in two phases. In the first phase, the call cost is determined as if the subscriber whose bill is derived from this particular EMI record originated the call. This includes the applying of any discounts to which the subscriber being billed would have been entitled to had they been the originator of the call, regardless of whether they actually originated the call. Thereafter, in the second phase, in accordance with the principles of the invention, the basic cost of the call as determined in the first phase is multiplied by the value, expressed as a percent, that is indicated in portion indicator 3421. The resulting basic cost, yields the same basic cost as charging each indivisible time period of the call at a period cost as if the subscriber to be billed originated the call and multiplying each such period cost, before it is added to the accruing basic cost, by the value indicated in portion indicator 5421. The resulting basic cost is then placed in call charge 3418 field of the EMI record.

Advantageously, such an embodiment permits each subscriber to benefit from any discount plans offered by IXC 30 to which they have subscribed. Additional known functionalities not relevant here may also be carried out by the rating system. Rating system 331 transfers, or transmits, as described above, the now rated EMI messages to the billing system appropriate for each, for subsequent processing.

It is noted that subscription to the call cost sharing feature by the terminating subscriber, effected by being listed in a DN trigger table, has been described. Such subscription is not necessary if the CPAs or IXC switches have sufficient capacity to monitor every call for the invocation of the call cost sharing feature by the terminating subscriber.

Figure 5:
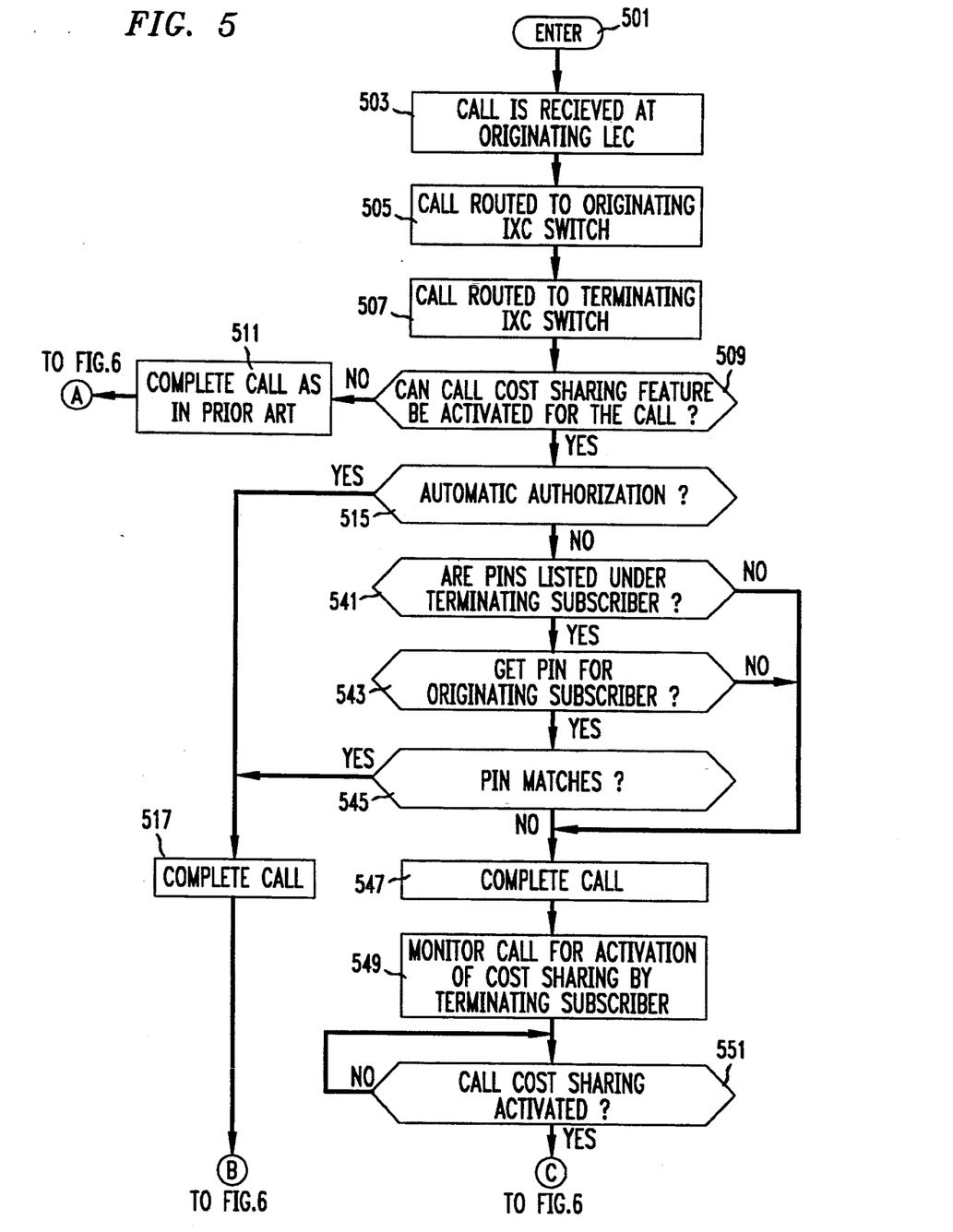
FIGS. 5 and 6, when connected together, show a process for allowing the originating and terminating subscribers to share the basic cost of a call between them, in accordance with the principles of the invention.
Figure 6:
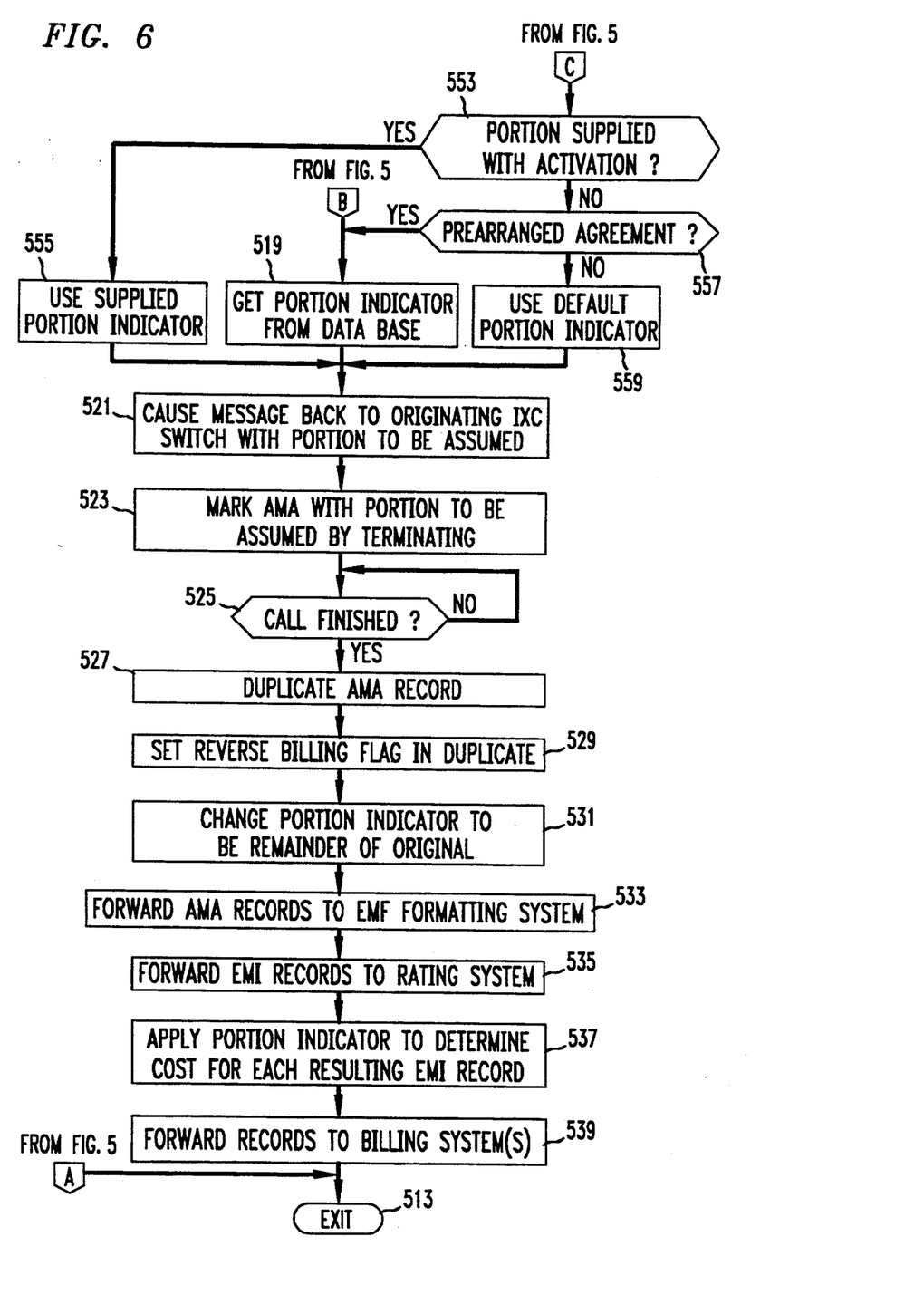

FIGS. 5 and 6, when connected together, show a process for allowing the originating and terminating subscribers to share the basic cost of a call between them, in accordance with the principles of the invention. The process is entered in step 501 when a call is originated by subscriber 11. In step 503, local switch 21 of LEC 20 receives the call and, in step 505, local switch 21 forwards the call to originating IXC switch 301. IXC switch 301, in turn, routes the call to terminating IXC switch 302 in step 507.

Next, conditional branch point 509 tests to determine if the call cost sharing feature can be activated for the call. In the embodiment shown in FIG. 1, to do so, terminating IXC switch 302 tests to determine if terminating subscriber's 51 telephone number is listed in its destination number (DN) trigger table 372 and if the terminating subscriber is listed in CPA 382 as having subscribed to the call cost sharing feature. If the test result in step 509 is NO, control passes to step 511 and the call is completed to terminating subscriber 51, as in the prior art. Control then passes to step 513, in which the process is exited.

If the test result in step 509 is YES, control passes to step 515, which tests to determine if automatic authorization of call cost sharing has been agreed to by terminating subscriber 51 for calls originated by originating subscriber 11. If the test result in step 515 is YES, control passes to step 517, in which IXC terminating switch 302 completes the call through local switch 41 of LEC 40 to terminating subscriber 51. Control then passes to step 519, in which the indicator of the portion of the basic cost that the terminated subscriber agrees to accept for calls from the originating subscriber is obtained from a data base, e.g. data base 386. Next, in step 521, an authorization message, in accordance with an aspect of the invention, is sent back to originating IXC switch 301 containing an indication of a portion of the basic cost to be assumed by terminating subscriber 51.

In step 523, originating IXC switch 301 marks the AMA record for the call with the received indication, in accordance with the principles of the invention. Conditional branch point 525 tests to determine if the call is finished. If the test result in step 525, control remains at step 525 to await the finishing of a call. If the test result in step 525 is YES, control passes to step 527 in which a duplicate of the AMA record is created, in accordance with an aspect of the invention.

In step 529, the reverse billing flag of the duplicate AMA record is set. In accordance with an aspect of the invention in step 531, the portion indicator of the original AMA record is changed to reflect the remaining portion that is not to be assumed by the terminating subscriber. Next, in step 533, the AMA records are forwarded to an EMI formatting system and, in step 535, the formatted EMI records are forwarded to a rating system. In accordance with the principles of the invention, in step 537, the portion indicators in the EMI records resulting from the original and duplicated AMA records are applied, so that the basic cost assigned to each subscriber reflects the assumption by the terminating subscriber of that portion of the cost that he agreed to assume. In step 539, the resulting EMI records, are forwarded to the appropriate billing system(s) and, thereafter, the process exits in step 513.

If the test result in step 515 is NO, control passes to conditional branch point 541, which tests to determine if PINs are listed in a data base under the ANI of terminating subscriber 51. If the test result in step 541 is YES, control passes to conditional branch point 543, which tests to determine if a PIN is received from originating subscriber 11 with a predetermined period of time. If the test result in step 543 is YES, control passes to conditional branch point 545, which tests to determine if the received PIN matches one of the PINs listed under the ANI of terminating subscriber 51. If the test result in step 545 is YES, control passes to step 517, and the process continues as described above. If the test result in steps 541, 543 or step 545 is NO, control passes to step 547.

In step 547, IXC terminating switch 302 completes the call through local switch 41 of LEC 40 to terminating subscriber 51. Next, in step 549, monitoring is begun to detect if the call cost sharing feature is activated by terminating subscriber 51. Conditional branch point 551 tests to determine if the call cost sharing feature has been activated. If the test result in step 551 is NO, control passes back to step 551 to continue monitoring. Of course, if the call is terminated before activation of the feature, monitoring, as well as the entire process, is terminated.

If the test result in step 55 1 is YES, control passes to conditional branch point 553, which tests to determine if a portion indication was supplied with the activation of the call cost sharing feature. If the test result in step 553 is YES, control passes to step 555, in which the indicated portion is used as the portion of the basic cost of the call to be assumed by terminating subscriber 51. Control then passes to step 521 and the process continues as described above.

If the test result in step 553 is NO, control passes to step 557, which tests to determine if there is a prearranged agreement by the terminating subscriber to assume a predetermined portion of the basic cost of calls from the particular originating subscriber. If the test result in step 557 is YES, control passes to step 519 in which the prearranged portion indicator is obtained from a data base and the process continues as described above. If the test result in step 557 is NO, control passes to step 559 and, a default portion, indicated by a portion indicator of appropriate magnitude, is assigned as the portion of the cost to be assumed by the terminating subscriber. Control then passes to step 521 and the process continues as described above.

In accordance with another embodiment of the invention, the terminating subscriber may agree to accept a portion of the charges for only some of the indivisible time periods of a call. For example, a terminating subscriber may choose to accept a portion of the charges only for those indivisible time periods after he activates the call cost sharing feature. In such an embodiment, the call is set up with CPA 382 in monitor mode to receive dual tone multi-frequency tones from the terminating subscriber. Upon activation of the call cost sharing feature, CPA 382 sends a message which eventually causes IXC originating switch 301 to mark the AMA record for the call as described above, and furthermore, to mark the time of activation of the call cost sharing feature in a share start time field of the AMA record, from which will be filled share start time field 3423 of the EMI record shown in FIG. 2. Operation again proceeds as described above until it is time for a rating system to attempt to rate any of the resulting for the call EMI records.

To determine the cost to be assigned to each such an EMI record, the rating system computes both a) the length of time and b) the cost of the call from the time stored in start time field 3413 until the time stored in share start time field 3423. Then it computes the basic cost of the call from share start time field 3423 until the end of the call, using as the start time the time stored in share start time field 3423 and as the elapsed time the difference between the value stored in elapsed time filed 3414 and the just computed length of time. The value, expressed as a percent, that is indicated in portion indicator 3421 is multiplied by the cost of the latter computed cost and the result is added to the former computed cost, thereby yielding the cost, in accordance with an aspect of the invention, to be paid by the subscriber who's EMI record was just rated.

CPA 382, instead of ceasing to monitor upon activation of the call cost sharing feature, may also monitor for a share end code, e.g., * 2 2, or a share change code, e.g., * 2 3 # D D, where D D is a two digit percentage indicator. Accordingly, at least one additional field, share end time field 3424 is added to the EMI record shown in FIG. 2. CPA 382 causes the time that it receives the share end code to be marked in the AMA record, by sending appropriate messages. This value is ultimately transferred to share end time field 3424 of the EMI record shown in FIG. 2. When the resulting EMI records are rated, the value stored in portion indicator 3421 is applied to the period costs for indivisible time periods only until the time indicated in share end time field 3424. If the reverse billing flag is set, no further charges are added to the cost. If the reverse billing flag is not set, the full cost of any remaining time periods is added to the already determined portion of the basic cost.

In further embodiments of the invention, the share change code may be used to indicate a change in the portion of the period costs that the terminating subscriber is willing to accept for following indivisible time periods. Additional share end time fields may be associated with additional, respective, portion indicators, so that the period costs for indivisible time periods between successive share end time fields may be determined and the corresponding portions of such costs totalized by the rating system to produce the cost charged to each subscriber.

It is noted that wherever dual tone multi-frequency tones are called for, or alerts indicated, that speech, or other input/output techniques, as appropriate and obvious to those skilled in the art, may be employed.

It is also noted that those skilled in the art will readily be able to apply the above disclosed embodiments of the invention directly to facsimile (fax) calls, data calls and video calls, and such applications are included within the scope of the invention. Furthermore, those skilled in the art will readily be able to apply the principles of the invention, disclosed herein, to develop embodiments of the invention for conference calls, collect calls, credit card calls, and operator assisted calls, and such applications are included within the scope of the invention.

The present invention is advantageous because it allows the basic cost of communicating to be apportioned among those that are communicating. Another advantage is that the call cost sharing may be invoked automatically, spontaneously, or even, at least partly, retroactively. A further advantage is that the total of the basic costs paid by each subscriber may be less than the total basic cost for such a call had the originating subscriber been charged the basic cost of the entire call.

We claim:

1. A method for use in billing a telephone toll call between at least an originating subscriber and a terminating subscriber, said telephone toll call having a length that is a sum of the predetermined lengths of indivisible time periods that pass during said telephone toll call, the method comprising the steps of:
   detecting an authorization signal indicating that said terminating subscriber and said originating subscriber agree to share the period cost incurred for at least one of said indivisible time periods of said telephone toll call; and
   marking at least one billing record associated with said telephone toll call, in response to said detected authorization signal, to indicate that the period cost incurred for said at least one indivisible time period is to be divided into at least two portions.

2. The invention as defined in claim 1 wherein the period cost is divided into two portions and said two portions are billed, one each, to said terminating subscriber and said originating subscriber.

3. The invention as defined in claim 2 further including the step of generating bills for said terminating and originating subscribers, said bills including at least their respective portions of the period cost of said at least one indivisible period, if said billing record is marked.

4. The invention as defined in claim 1 wherein said portions include a first portion of the period cost of said at least one indivisible time period agreed to be paid by said terminating subscriber and a second portion that is the period cost of said at least one indivisible time period for said indivisible time period minus the cost of said first portion.

5. The invention as defined in claim 4 further including the step of generating bills for said terminating and originating subscribers, said bills including at least their respective portions of the period cost of said at least one indivisible period, if said billing record is marked.

6. The invention as defined in claim 1 wherein said telephone toll call has an associated basic cost that is the sum of said period costs for all of said indivisible time periods that pass during said telephone toll call, said method further including the step of:
   creating two billing records associated with said telephone toll call;
   and wherein said step of marking is implemented by the step of:
   modifying a first one of said two billing records to indicate that said terminating subscriber is to be billed for a portion of said basic cost of said telephone toll call that is a predetermined percentage of the basic cost of said telephone toll call, said percentage being less then one hundred percent but more than zero percent; and modifying a second one of said billing records to indicate that said originating subscriber is to be billed for a portion of said basic cost of said telephone toll call that is the entire basic cost of said telephone toll call less the amount to be billed to said terminating subscriber.

7. The invention as defined in claim 6 further including the step of generating bills for said terminating and originating subscribers, for their respective portions of said basic cost of said telephone toll call, if said billing record is marked.

8. A method for use in billing the basic cost of a telephone toll call between an originating subscriber and a terminating subscriber, said basic cost being a function of the accumulation of a predetermined period cost for each predetermined length indivisible time period that elapses during the telephone toll call, the method comprising the steps of:
   detecting an authorization signal indicating that the terminating subscriber agrees to share with said originating subscriber the predetermined period cost for at least one of said predetermined length indivisible time periods of said telephone toll call; and
   marking a billing record associated with said telephone toll call, in response to said authorization signal, to indicate that the predetermined period cost for said at least one predetermined length indivisible time period is being shared by both said terminating subscriber and said originating subscriber.

9. The invention as defined in claim 8 wherein said predetermined period cost for each predetermined length indivisible time period is a function of the characteristics of said originating and said terminating subscribers.

10. The invention as defined in claim 8 including the step of charging respective accounts associated with each of said originating and terminating subscribers for respective portions of said predetermined period cost for said at least one predetermined length indivisible time period for which said basic cost is being shared.

11. The invention as defined in claim 10 further including the step of generating bills, to be supplied to said terminating and originating subscribers, for their resulting respective portions of the basic cost of said telephone toll call, if said billing record is marked.

12. The invention as defined in claim 10 wherein said portion charged to said account associated with said terminating subscriber is a function of at least one characteristic of said originating subscriber.

13. The invention as defined in claim 12 wherein said characteristic of said originating subscriber is the having of a particular telephone number.

14. The invention as defined in claim 12 wherein said characteristic of said originating subscriber includes at least knowing a particular personal identification number (PIN).

15. The invention as defined in claim 12 wherein said characteristic of said originating subscriber includes having particular measurements for specified measurable physical characteristics.

16. A method for use in billing telephone toll calls between a terminating subscriber and a plurality of originating subscribers, each of said telephone toll calls costing a basic cost determined by summing period costs for each indivisible time period passing during one of said telephone toll calls, the method comprising the steps of:
   storing information which indicates that an account associated with the terminating subscriber agrees to pay for a predetermined portion of the basic cost resulting from telephone toll calls from at least one of said plurality of originating subscribers, said portion including at least a portion of the period cost for at least one indivisible time period during said telephone toll calls, said indicator being stored prior to the initiation of said telephone toll call; and
   marking a billing record associated with a particular telephone toll call between said terminating subscriber and said at least one originating subscriber, in response to said stored information, to indicate that at least said agreed to portion of the basic cost for said telephone toll call is to be charged to said account associated with the terminating subscriber.

17. The invention as defined in claim 16 further including the steps of:
   generating bills including information from said marked billing record; and
   supplying said bills, for their respective portions of the basic cost of said telephone toll call, if said billing record is marked, to said terminating and originating subscribers.

18. A method for use in billing the basic cost of telephone toll calls between an originating station set and a terminating station set, each of said station sets being associated with a respective telephone account and having an owner, the basic costs of telephone toll calls made from said station sets being charged to said respective accounts, each of said respective telephone toll calls having a particular basic cost, said basic cost for each respective one of said telephone toll calls being determined by summing period costs for each indivisible time period passing during said respective ones of said telephone toll calls, the method comprising the steps of:
   generating a signal indicating that the owner of an account associated with the terminating station set agrees to pay for a predetermined portion of the basic cost of each telephone toll call from said originating station set, said portion including at least a portion of the period cost for at least one indivisible time period that passes during each respective telephone toll call from said originating station set, said signal being generated after the setup of said telephone toll call; and
   marking a billing record associated with each particular respective telephone toll call, substantially contemporaneously therewith, in response to said authorization signal, to indicate that at least said agreed to portion of the basic cost for said particular telephone toll call is to be billed to said account associated with the terminating station set.

19. The invention as defined in claim 18 further including the step of generating bills for said terminating and originating subscribers, for their respective portions of the basic cost of each of said respective telephone toll calls, if said billing record is marked.

20. A method for use in the billing of a telephone toll call between an originating subscriber and a terminating subscriber, said telephone toll call having a duration defined by a set of indivisible identical length time periods that pass during the existence of said telephone toll call, said telephone toll call costing a basic cost that is the sum of respective period costs associated with each of the indivisible identical length time periods of said set, the method comprising the step of:

responsive to receipt of an authorization signal indicating that said terminating subscriber agrees to share a portion of the basic cost of said telephone toll call, said portion including at least a portion of the period cost of at least one of said indivisible identical length time periods in said set, marking a billing record associated with said telephone toll call to indicate that said portion of the cost of said telephone toll call is to be billed to said terminating subscriber.

21. The invention as defined in claim 20 further including the step of generating a bill for said terminating subscriber's portion of the cost of said telephone toll call, if said billing record is marked.

22. A method for use in the billing the basic cost of a telephone toll call between an originating subscriber having particular characteristics and a terminating subscriber, the method comprising the steps of:

storing in a data base information indicating that said terminating subscriber agrees to pay for a percentage of the basic cost of telephone toll calls from selected subscribers, said selected subscribers having a particular value of at least one specified characteristic;

receiving information about the value of said at least one specified characteristic for said originating subscriber;

looking up said received information in said data base for said terminating subscriber;

responding to a match of said received information with said stored information by generating an authorization signal indicating that the terminating subscriber agrees to pay said stored percentage of the period cost for each indivisible time period of said telephone toll call; and marking a billing record associated with said telephone toll call, in response to said authorization signal, to indicate that portions of the basic cost of said telephone toll call are to be billed to both said terminating and originating subscribers.

23. The invention as defined in claim 22 further including the step of generating bills for said terminating and originating subscribers, for their respective portions of the cost of said telephone toll call, if said billing record is marked.

24. The invention as defined in claim 22 wherein said particular value of said at least one specified characteristic is a predetermined telephone number.

25. The invention as defined in claim 22 wherein said particular value of said at least one specified characteristic is a value of a predetermined personal identification number.

26. The invention as defined in claim 22 wherein said particular value of said at least one specified characteristic is a predetermined measurement indicator of a particular physical characteristic of said originating subscriber.

27. A method for use in the billing of a telephone toll call between a originating subscriber and a terminating subscriber costing a basic cost developed by summing each respective period cost associated with each indivisible time period occurring during the existence of said telephone toll call, the method comprising the steps of:

generating an authorization signal indicating that the terminating subscriber agrees to pay for a percentage of the basic cost of said telephone toll call, said generating being automatically performed without intervention of any person not directly a subscriber to said telephone toll call;

creating a second billing record by duplicating a first billing record associated with said telephone toll call, in response to said authorization signal;

modifying said second billing record to indicate that said terminating subscriber is to be billed for a first amount that is a predetermined percentage of the basic cost of said telephone toll call, said percentage being less then one hundred percent but more than zero percent and being applied against each respective period cost for each indivisible time period of said telephone toll call; and modifying said first billing record to indicate that said originating subscriber is to be billed for a second amount that is the basic cost of the telephone toll call less the amount to be billed to the terminating subscriber.

28. The invention as defined in claim 27 further including the step of generating bills for said terminating and originating subscribers, for their respective amounts of the cost of said telephone toll call, if said billing record is marked.

29. A method for use in the billing of a telephone toll calls between an originating station set and a terminating station set, said telephone toll calls existing for a number of predetermined indivisible time periods, said originating and terminating station sets each being associated with a respective telephone account, each having an owner, to which the basic cost of telephone toll calls made from said station sets are charged, the method comprising the steps of:

storing an authorization indicator which indicates that the owner of the account associated with the terminating station set agrees to pay for a predetermined portion of the basic cost resulting from telephone toll calls from said originating station set, said indicator being stored prior to the initiation of said telephone toll call;

generating an authorization signal when a telephone toll call is being set up between said originating station set and said terminating station set if an authorization indicator is stored for said terminating station set indicating agreement to pay for a portion of the basic cost of telephone toll calls from said originating station set; and marking a billing record associated with said telephone toll call, in response to said authorization signal, to indicate that at least a portion of the cost for said telephone toll call, including at least a portion of the period cost associated with at least one of said indivisible time periods, is to be billed to said account associated with the terminating station set.

30. The invention as defined in claim 29 further including the step of charging the accounts associated with said terminating and originating station sets for their respective portions of the basic cost of said telephone toll call, if said billing record is marked.

31. A method for use in the billing of a telephone toll call existing for at least one predetermined indivisible time period, said telephone toll call being between a first subscriber who, after set up of said telephone toll call, is responsible for the entire basic cost of said telephone toll call, said basic, cost being a sum of period costs, one period cost being associated with each predetermined identical length, indivisible time period that lapses during said telephone toll call and a second subscriber who, after set up of said telephone toll call, is responsible for none of the basic cost of said telephone toll cost, the method comprising the steps of:

detecting, after said telephone toll call is set up, an authorization signal indicating that the second subscriber agrees to share with said first subscriber the basic cost incurred for said telephone toll call during at least one time span, said at least one time span having a length that is accounted as an integral multiple of the length of one of said predetermined identical length indivisible time periods, the length of said at least one time span being determinable at the end of said telephone toll call; and     marking at least one billing record associated with said telephone toll call, in response to said detected authorization signal, to indicate that the period cost incurred for each predetermined identical length indivisible time period that elapsed during said at least one time span is to be divided into two portions, with one portion of said period costs for each elapsed indivisible time period being assigned to each of said first and second subscribers.

32. A method for use in billing a telephone toll call between at least an originating subscriber and a terminating subscriber, said telephone toll call having a length that is a sum of the predetermined lengths of indivisible time periods that pass during said telephone toll call, the method comprising the steps of:

detecting an authorization signal indicating that said terminating subscriber and said originating subscriber agree to share the period cost incurred for at least one of said indivisible time periods of said telephone toll call;

generating, in response to said authorization signal, at least one record indicative of said agreed to sharing.

33. Apparatus for use in billing a telephone toll call between at least an originating subscriber and a terminating subscriber, said telephone toll call having a length that is a sum of the predetermined lengths of indivisible time periods that pass during said telephone toll call, said apparatus comprising:

means for detecting an authorization signal indicating that said terminating subscriber and said originating subscriber agree to share the period cost incurred for at least one of said indivisible time periods of said telephone toll call; and     means for marking at least one billing record associated with said telephone toll call, in response to said detected authorization signal, to indicate that the period cost incurred for said at least one indivisible time period is to be divided into at least two portions.

34. Apparatus for use in billing a telephone toll call between at least an originating subscriber and a terminating subscriber, said telephone toll call having a length that is a sum of the predetermined lengths of indivisible time periods that pass during said telephone toll call, said apparatus comprising:

means for detecting an authorization signal indicating that said terminating subscriber and said originating subscriber agree to share the period cost incurred for at least one of said indivisible time periods of said telephone toll call; and     means, responsive to said authorization signal, for generating at least one record indicative of said agreed to sharing.

* * * * *